US011645345B2

(12) United States Patent
Zeng et al.

(10) Patent No.: US 11,645,345 B2
(45) Date of Patent: *May 9, 2023

(54) SYSTEMS AND METHODS FOR ISSUE TRACKING SYSTEMS

(71) Applicant: Atlassian Pty Ltd, Sydney (AU)

(72) Inventors: Chaoyang Zeng, Hurstville (AU); Clement Capiaux, Camperdown (AU); Anna Katrina Walser, Brooklyn, NY (US); Shihab Hassan Hamid, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,434

(22) Filed: May 7, 2020

(65) Prior Publication Data

US 2020/0265103 A1   Aug. 20, 2020

Related U.S. Application Data

(63) Continuation of application No. 15/199,651, filed on Jun. 30, 2016, now Pat. No. 10,810,271.

(51) Int. Cl.
*G06F 16/9535* (2019.01)
*G06F 16/332* (2019.01)
*H04L 67/50* (2022.01)
*H04L 67/02* (2022.01)

(52) U.S. Cl.
CPC ...... *G06F 16/9535* (2019.01); *G06F 16/3329* (2019.01); *H04L 67/535* (2022.05); *H04L 67/02* (2013.01)

(58) Field of Classification Search
None
See application file for complete search history.

(56) References Cited

U.S. PATENT DOCUMENTS 8,135,612 B1 *   3/2012   Scudder ......... G06Q 10/063112
                                              705/7.14
8,688,464 B2 *   4/2014   Sunday ............... G06Q 50/182
                                              705/1.1

(Continued)

OTHER PUBLICATIONS

Misayo et al., "Help Desk System", 1997 (Year: 1997).*

(Continued)

*Primary Examiner* — Dawaune A Conyers
(74) *Attorney, Agent, or Firm* — Brownstein Hyatt Farber Schreck, LLP

(57) ABSTRACT

A method for use in an issue creation process, before an issue is submitted, in an issue tracking system (ITS), comprises receiving an unstructured user input expressing an issue description and comprising one or more query keywords; querying a database of historic issue data to determine historic issues from the historic issue data that are relevant to the one or more query keywords and, in response to the determination, extracting request types from the historic issues; generating, from the extracted request types, a list of possible request types for allocation to the unstructured user input; receiving a user input of a particular request type selected from the list of possible request types and, in response, allocating the particular request type to the issue. The issue is submitted to the ITS for routing the issue to an appropriate service desk according to the particular request type.

17 Claims, 6 Drawing Sheets

(56) References Cited

U.S. PATENT DOCUMENTS

| | | |
|---|---|---|
| 2003/0046308 A1* | 3/2003 | Weber .................. G06Q 30/02 |
| 2008/0034060 A1 | 2/2008 | Fisher |
| 2010/0031178 A1 | 2/2010 | Motobayashi |
| 2011/0055699 A1 | 3/2011 | Li |
| 2012/0042318 A1 | 2/2012 | Doan |
| 2012/0072229 A1 | 3/2012 | Zaldivar |
| 2013/0030948 A1 | 1/2013 | Fisher |
| 2013/0074038 A1 | 3/2013 | Fox |
| 2013/0262082 A1* | 10/2013 | McKeeman ............ G06F 40/20 704/9 |
| 2015/0006492 A1 | 1/2015 | Wexler |
| 2017/0372231 A1 | 12/2017 | Ghatage |
| 2018/0004848 A1 | 1/2018 | Zeng |
| 2018/0039610 A1 | 2/2018 | Litvak |

OTHER PUBLICATIONS

Zeng, U.S. Appl. No. 15/199,651, filed Jun. 30, 2016, Office Action, dated Oct. 21, 2019.

Zeng, U.S. Appl. No. 15/199,651, filed Jun. 30, 2016, Office Action, dated Nov. 1, 2017.

Zeng, U.S. Appl. No. 15/199,651, filed Jun. 30, 2016, Office Action, dated Feb. 25, 2019.

Zeng, U.S. Appl. No. 15/199,651, filed Jun. 30, 2016, Interview Summary, dated Mar. 25, 2019.

Zeng, U.S. Appl. No. 15/199,651, filed Jun. 30, 2016, Final Office Action, dated Sep. 6, 2018.

Zeng, U.S. Appl. No. 15/199,651, filed Jun. 30, 2016, Final Office Action, dated Jul. 10, 2019.

Zeng, U.S. Appl. No. 15/199,651, filed Jun. 30, 2016, Final Office Action, dated Apr. 20, 2017.

Zeng, U.S. Appl. No. 15/199,651, filed Jun. 30, 2016, Advisory Action, dated Nov. 1, 2018.

Zeng, U.S. Appl. No. 15/199,651, filed Jun. 30, 2016, Advisory Action, dated Aug. 28, 2019.

Zeng, U.S. Appl. No. 15,199,651, filed Jun. 30, 2016, Notice of Allowance, dated Feb. 25, 220.

U.S. Appl. No. 15/199,561, filed Oct. 17, 2016, Office Action, dated Oct. 17, 2016.

* cited by examiner

SYSTEMS AND METHODS FOR ISSUE TRACKING SYSTEMS

BENEFIT CLAIM

This application claims the benefit under 35 U.S.C. § 120 as a continuation of application Ser. No. 15/199,651, filed Jun. 30, 2016, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2016 Atlassian Pty Ltd.

FIELD OF THE DISCLOSURE

The present disclosure generally relates to systems and methods for issue tracking systems.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Issue tracking systems (variously referred to as trouble ticket systems, support ticket systems, request management systems, and incident ticket systems or ITS) manage the creation and tracking of issues in a variety of contexts. By way of example, an ITS may be implemented in a service desk scenario, in which case the "issues" may be user requests or tickets logged with the service desk. An ITS may be implemented in a project management scenario, in which case "issues" may be project tasks or work items. An ITS may be implemented in a software development scenario, in which case "issues" may be bugs, features currently under development, and/or features intended for future development. An ITS may be implemented in an organizational administration scenario, in which case "issues" may be administrative processes or forms (e.g. leave request processes/forms or the like). Many alternative implementations and types of issues are possible for different implementations of issue tracking systems. Example ITSs include JIRA and JIRA Service Desk, which are commercially available from Atlassian Pty Ltd., Sydney, Australia.

A busy ITS may manage thousands, tens of thousands, or even more issues submitted by users. Each issue may have a different priority, require different actions, and/or be handled by multiple people over its lifecycle.

In order to assist in managing issues, an issue tracking system may require a user to provide various information about an issue so that the issue can be processed more efficiently by the ITS. This is often required to be done when an issue is first created and entered into the system. Some systems require a user to categorize an issue when it is first being created. However, for a complex issue tracking system that has a large number of issue categories and sub-categories, or for an organization that deploys a plurality of issue tracking systems (e.g., where each is used for a different type of issue), it can be challenging or time consuming for a user to locate the appropriate or most suitable issue category. It can also be difficult if the user does not know what categories are available to choose from. There is a need to make this process more efficient for an ITS, so that its users can categorize issues in a user-friendly manner and also improve the quality and accuracy of the data maintained by the ITS.

The present disclosure aims to ameliorate at least some of the problems mentioned above or to provide an alternative choice for the public.

SUMMARY

The appended claims may serve as a summary of the invention.

DETAILED DESCRIPTION

Figure 1:
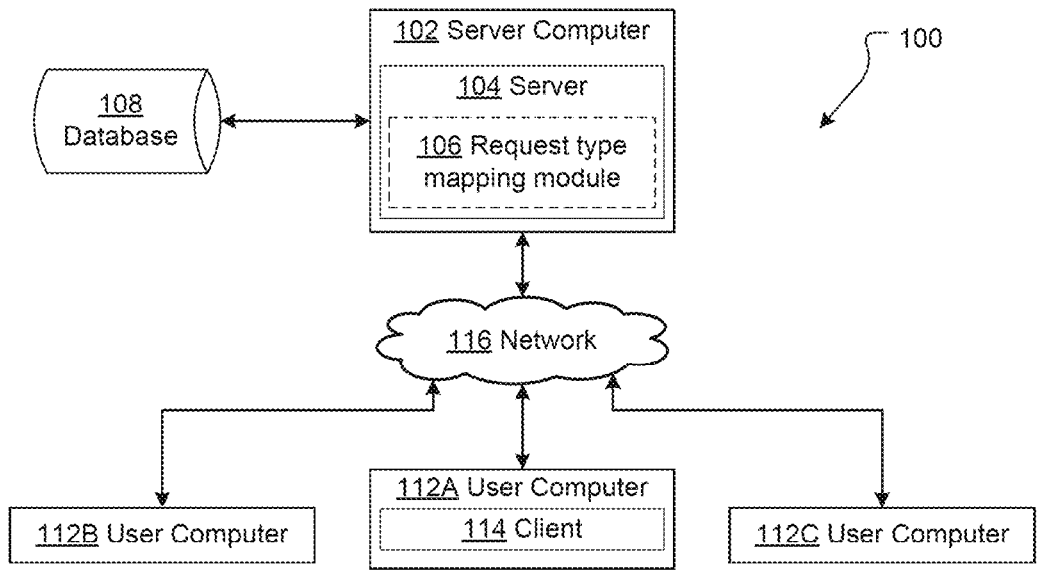
FIG. 1 illustrates a client server architecture suitable for use with the present disclosure.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

The present disclosure generally relates to systems and methods for an issue tracking system (herein: ITS). As mentioned above, issue tracking systems (variously referred to as trouble ticket systems, support ticket systems, request management systems, and incident ticket systems or ITS) manage the creation and tracking of issues in a variety of contexts. This task is made more difficult in a scenario in which the user does not frequently use the ITS, and thus is unfamiliar with the issue categories or sub-categories. It will be appreciated that many alternative implementations and types of issues are possible for each different implementation of an ITS.

As one example, an issue tracking system may be deployed as a service desk for handling user requests faced by members of an organization. An organization may have a single service desk that handles the full gamut of user requests. Alternatively, to balance the work load and enable processing and handling of issues by subject-matter specialists, an organization may deploy a plurality of service desks, with each service desk being configured to receive and process user requests that are of a certain category. The organization may assign dedicated staff members to look after each service desk so that the issues can be processed promptly.

The present disclosure relates to an ITS which allows a user to categorize a user request in a more efficient and user friendly manner. Members of the organization, may submit various requests to an ITS server via an ITS client, the ITS server subsequently processes and manages the received requests as 'issues'. Preferably, an issue item is generated for each corresponding user request submitted to the system. Categorization may be performed before and/or after a request is submitted to the system. More specifically, the present disclosure allows a user of an ITS to search for, and select, a request type for a user request that he or she wants to submit to the system, based on a query entered by a user at an ITS client. In some embodiments, it allows the user to search for, and select, either or both of a request type and/or a service desk for a user request. In this way, each user request is categorized with an appropriate request type, and/or a service desk, thereby allowing its corresponding 'issue' item to be processed in a more efficient manner. The functionality of the present disclosure will be described as being provided by a request type mapping module.

For the purposes of describing various features of the request type mapping module, an issue tracking system (ITS) will be used as the example host. The request type mapping module may be implemented in various ways. In one embodiment the request type mapping module is implemented as a plugin (also referred to as an add-in, add on, or extension) which extends the capabilities/functionality of a host application. In order to provide this context a general description of an ITS will be provided, followed by a description of a request type mapping module and its operation.

Architecture Overview

An ITS may be provided using a variety of different architectures. One implementation is a client server architecture where the ITS functionality is provided by a server computer and accessed by users from client computers. Two examples of a client server implementation are described generally below.

FIG. 1 illustrates a single server implementation of an ITS 100. ITS 100 comprises a server computer 102. Server computer 102 hosts an ITS server 104 for providing server-side ITS functionality. The ITS server 104 comprises one or more application programs, libraries, APIs or other software elements that implement the features and functions that are further described herein. In this example the ITS server 104 includes a request mapping module 106 which provides request type mapping functionality as described in detail below.

Server computer 102 also stores or has access to ITS data. The ITS data generally includes: ITS metadata defining the operation of the ITS, and issue data (i.e. data in respect of the issues that have been entered into the ITS and are being maintained by the ITS). ITS data may be stored in a database 108 which, for example, be stored on a local file system of the server computer 102, or a file system of another computer. Database 108 will typically be provided by a database server operating on a separate physical computer coupled (directly or indirectly via one or more networks) to ITS server computer 102. Database 108 may however be a database server operating on a server 102 itself.

The user computer 112A hosts an ITS client 114 which provides client-side ITS access. In one form, the ITS client 114 is used to create, enter, and/or edit an issue.

An ITS client 114 may be a general web browser application (such as, for example, Chrome, Safari, Internet Explorer, Opera). In this case the client 114 accesses the ITS server 104 via an appropriate uniform resource locator (URL) and communicates with the ITS server 104 using general world-wide-web protocols (e.g. http, https, ftp). The web browser application is configured to request, render and display electronic documents that conform to a markup language such as HTML, XML or extensions, and may be capable of internally executing browser-executable code such as JAVASCRIPT, VBScript, or other forms of code. Where the ITS client 114 is a web browser, the ITS server 104 may be a web server (such as, for example, Apache, IIS, nginx, GWS).

Alternatively, the ITS client 114 may be a specific application programmed to communicate with server 102 using defined application programming interface (API) calls. In this case the ITS server 104 will be a specific application server configured to interact with the ITS client application.

A user computer 112A may host more than one ITS client 114 (for example a general web browser client and a specific application client). Similarly, server computer 102 may host more than one ITS server 104.

The ITS server computer 102 may serve multiple user computers (or, more specifically, multiple ITS clients). In FIG. 1 three user computers have been depicted (112A, 112B, and 112C), though more or fewer could be used.

The server computer 102 and client computer 112A communicate data between each other either directly or indirectly through one or more communications networks 116. Communications network 116 may comprise a local area network (LAN) of an enterprise in one embodiment. In this case ITS 100 may be implemented as an on-premises solution in which the server computer 102 and user computer 112A are associated with the same business enterprise and at least the server computer 102 is within an enterprise-controlled facility that is protected from open internetworks using firewalls or other security systems. In another embodiment, network 116 may represent a public network and the server computer 102 may be located off-premises with respect to an organization, such as in a shared data center or cloud computing facility.

Figure 2:
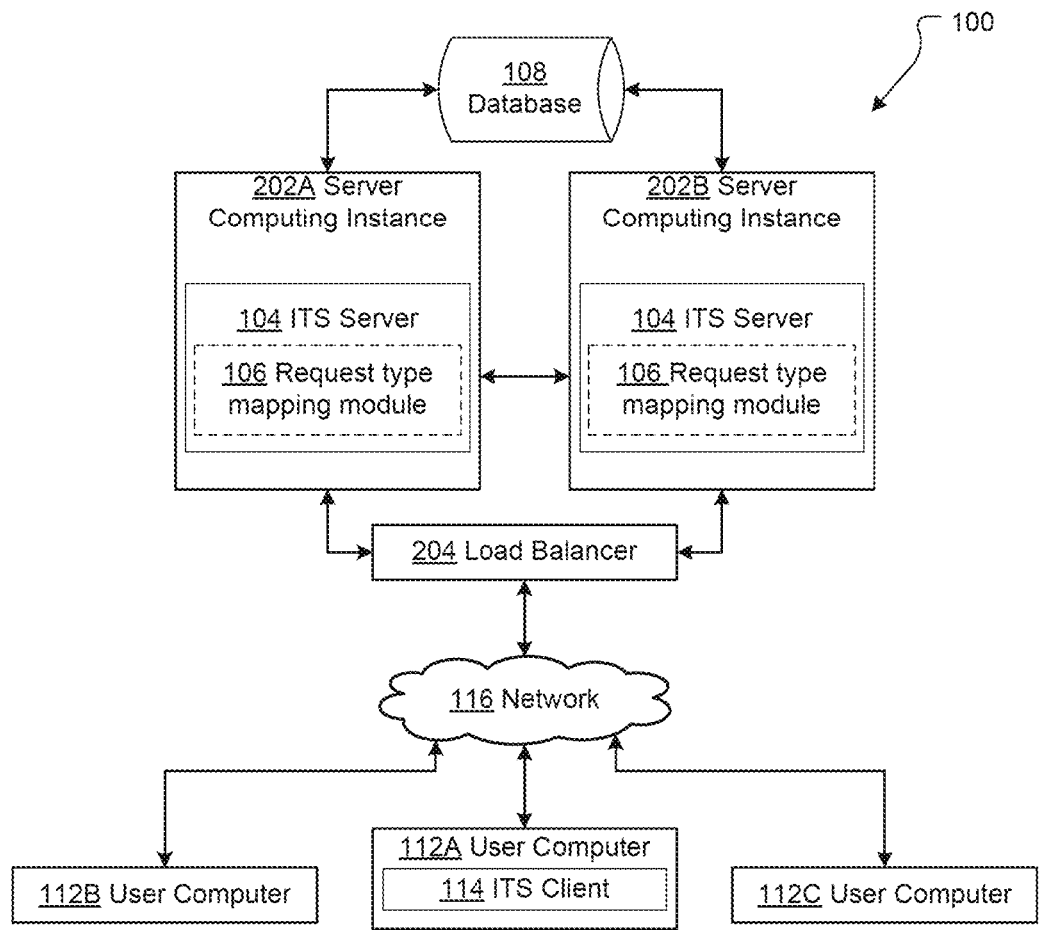
FIG. 2 illustrates another client server architecture suitable for use with the present disclosure.

While a single server client-server architecture has been described above, an ITS may be implemented using alternative architectures. For example, in certain cases a clustered architecture may be used where multiple server computing instances (or nodes) are instantiated to meet system demand as that shown in FIG. 2. In the arrangement of FIG. 2, the ITS 100 is implemented using one or more server computing instances 202A and/or 202B (or nodes). Examples include AMAZON WEB SERVICES, RACKSPACE, and private cloud data centers. A server computer instance is instantiated on or hosted in a computer, and in some instances a single computer may host several server computer instances. In FIG. 2 two server computing instances 202A and 202B have been depicted, but there may be any number of server computing instances instantiated from time to time based upon the number of ITS clients that access the instances, or other performance requirements.

Additionally, FIG. 2 also includes load balancer 204, which is used to distribute the workload between server computing instance 202A and server computing instance 202B.

Furthermore, the client server architecture described above could be used to implement alternative host systems/applications which are capable of making use of a request type mapping module (or request type mapping functionality) described herein.

ITS

Figure 3:
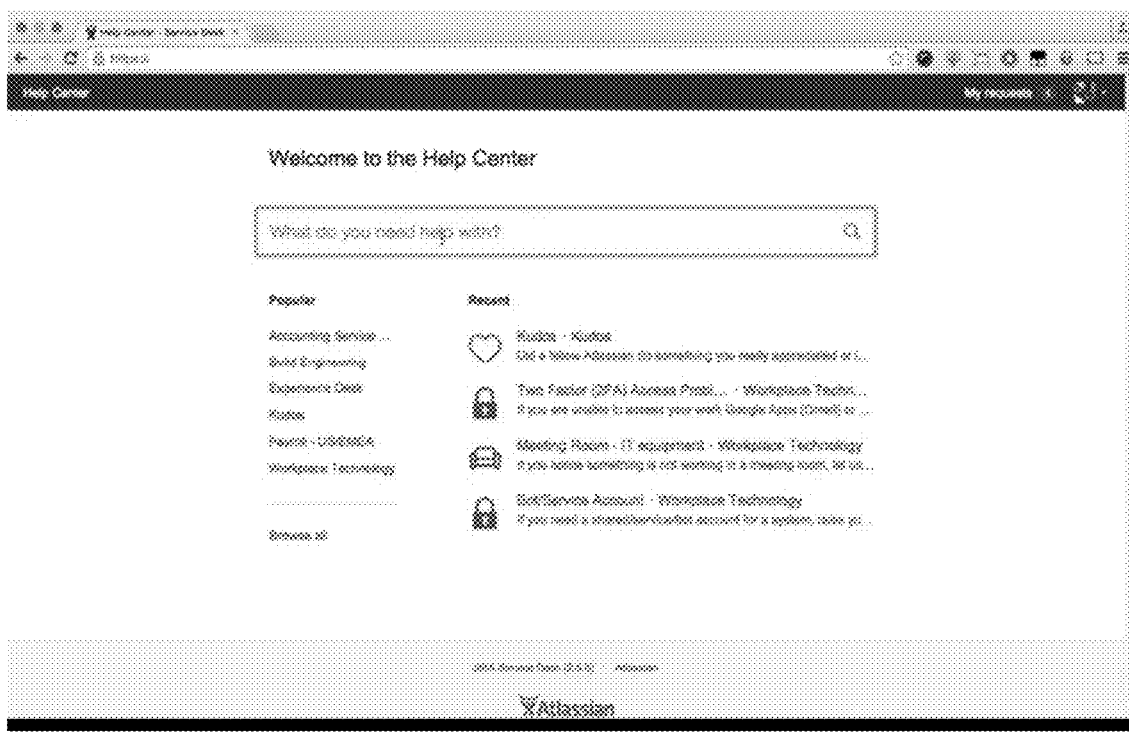
FIG. 3 shows a user interface of an exemplary ITS client provided in the form of a helpdesk portal page rendered in a web browser.

FIG. 3 shows a user interface of an exemplary ITS client provided in the form of a helpdesk portal page rendered in a web browser. Users of the ITS may have problems, requests, questions that they would like to submit to the ITS via such helpdesk portal. The ITS client facilitates a user of the ITS to provide relevant information of their request, and submit it to the server to generate its corresponding issue item. In other words, the ITS client assists a user to convert an otherwise unstructured user request such as 'I have a network connection problem' into an issue item comprising structured data representative of the actual user request and which can be stored and processed by the ITS server.

In one form, an issue item as represented in the ITS comprises a plurality of request data fields that are representative of the content of an actual user request. Preferably, at least some of the information required for those data fields are provided by a user when entering a user request into the system. The ITS extracts relevant data from the information provided by a user and stores such data in appropriate data fields of an issue item. The actual request data fields of an issue vary depending on the requirements of a given ITS implementation. In the present disclosure, an issue may contain one or more of the following data fields: a key field storing a unique identifier for the issue (e.g. a serial number), a time field indicating the time that an issue has been created in the system, an ITS client identifier indicating which ITS client computer the user request is submitted from (e.g. user ABC), a summary field storing a brief summary of the user request entered by a user (e.g. Can I get a trackpad), and a request type field indicating the category information of the user request (e.g. workspace request, hardware request etc.). The category information may be indicative of the nature of the user request, type of assistance required, type of action required, responsible service desk, whether an automated response or action can/should be triggered by the item, or similar. In one form, the request type data field of an issue is populated based on the request type name and/or a service desk name chosen by a user when entering a user request into the system, and is used by the ITS to allocate the issue within the ITS for action.

The request types of user requests may be predefined by the system and they may vary depending on the actual ITS implementation. A given ITS may have a list of predefined request types and a user is required to select one or more suitable request types when entering a user request into the system. A more complex ITS may have a hierarchy of different request types which dictates all the main and sub-categories of user requests that the system may receive over time. Similarly, a given ITS may also have a list of predefined service desks. In one embodiment, an ITS may have a number of service desks and each service desk may have an associated request type profile, indicative of the request types that the service desk is configured to receive and maintain.

It is desirable to allow a user to quickly locate the most appropriate request type. According to the disclosure, the request type mapping module allows a user to enter a query generally indicative of the request that they wish to enter into the system, and then based on the query, generates a list of recommended request types and/or service desk names to the user to facilitate selection of the most appropriate request type and/or service desk from the recommended list.

Figure 6:
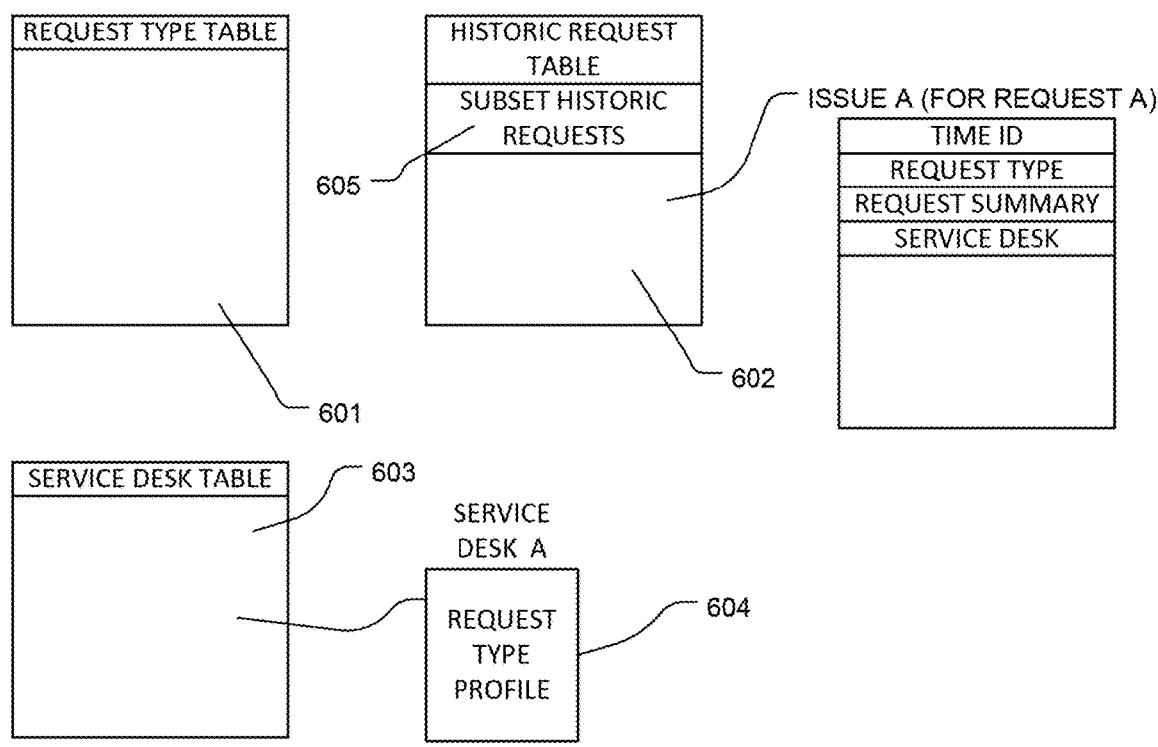
FIG. 6 shows an example database schema.

In one form, the request type mapping module maintains information in respect of system predefined request types and historic issue data representative of existing user requests in database 108. An ITS may maintain issues in a variety of data structures. In one embodiment, issues are stored in a relational database. FIG. 6 depicts a partial example of a simple relational database schema for one embodiment. The tables and fields of database schema are discussed below. Alternative database schemas with additional/fewer/alternative tables and/or fields may be used to capture and store relevant data.

Request type table 601 is used to store predefined request type names.

The database also maintains a record of issues added to the ITS, herein called the historic request table 602 which stores issues generated from user requests that the system has received in the past. In one form, all the issues stored in the server database are ranked based on a time value, for example, the time they are generated as issue items in the ITS. In one form, the historic request table stores at least a request type and the following request data, time ID, summary, service desk information, for each issue item.

In accordance with this disclosure, a subset 605 of the historic requests are searched by the request type mapping module for the purpose of generating one or more recommended request types based on a user's query. In one form, the subset historic requests 605 include a predetermined number of the most recent issue items generated by the system. In one form, the subset historic requests 605 include the last 500, 300, or 200 issue items generated by the system. In a simplest form, the subset historic requests 605 include 200 most recent issue items, and for each issue item it only stores the request type and some request data, for example the summary information. In one implementation the historic requests table 602 includes all requests received by the ITS, including live issues as well as resolved issues, cancelled issues and any other desired status. In this case, the search can be conducted using a search tool such as Lucene™ which conducts full text searching of the stored issues. In this embodiment the search can be conducted over a subset of the n most recent issues (according to their TIME ID).

In other forms, the subset historic requests 605 may alternatively or additionally be limited based on other selection criteria, for example, user location, user practice/business unit, service desk.

In one alternative form, the subset of historic requests 605 may be stored in a separate database table, that is regularly updated by the ITS, e.g. as new user requests are received to generate new issue items, or periodically.

In some embodiments, there is also a service desk table 603 which stores a list of ITS service desk names. In addition, the service desk table 603 may also store a request type profile 604 for each service desk, which dictates one or more request types that are associated with each service desk. In one embodiment, the server may have a mechanism to only allow the person(s) in charge of a given service desk to manage and process issue items that are generated from those user requests which match the request type profile of that particular service desk.

An issue may be created with additional data fields, such as: a status field indicating the stage an issue is currently at in its lifecycle, an assigned person field indicating who (if anyone) an issue has been assigned to, a severity field storing the severity of an issue (e.g. critical, major, minor), a priority field storing the priority of an issue at a general level (e.g. urgent, high, low, etc.), a rank field storing a rank value in respect of an issue (defining a rank order of the request relative to other requests). It will be appreciated that an issue can be created with one or a plurality of the above data fields based on the requirements of a given ITS implementation. The user may be required to manually enter some of the data field information mentioned above, and/or the ITS client or server may automatically populate some data field information for the request.

The Schema of FIG. 6 has been provided for descriptive purposes, however a relational database schema for an ITS will typically be considerably more complex and have additional/different tables with additional/alternative fields and linked in alternative ways. Furthermore, different data structures entirely could, in some cases, be used. For example, issues could be stored in a single table data structure (which may be appropriate for relatively simple ITSs) where the single table stores all relevant issue data.

Request Type Mapping

Figure 7:
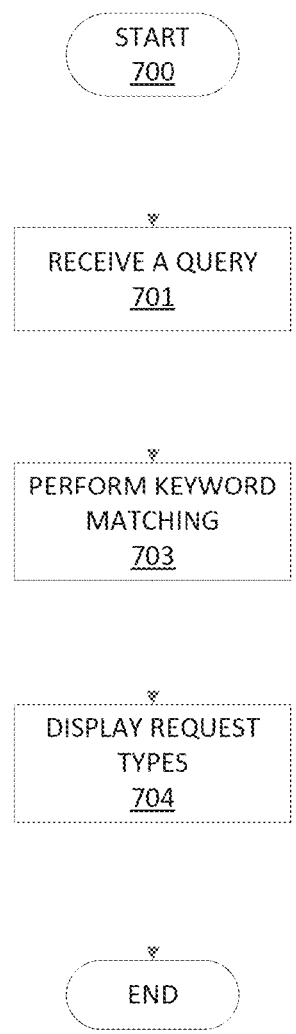
FIG. 7 depicts a flow chart of the steps that the request type mapping module performs to locate the recommended request types for a given user query.

FIG. 7 depicts a flow chart of the steps that the request type mapping module may take to locate the relevant request types in accordance with one embodiment of the disclosure.

The process of FIG. 7 begins at step 700 with a user, who wishes to raise an item in the ITS, accessing the ITS client, in this example by using a browser, as shown in FIG. 3. The first step in creation of the issue in the ITS is the selection of a request type. As discussed above, the request type can put to a variety of uses, including routing the issue to the appropriate service desk, or team member. In order to begin the process of FIG. 7, the interface of FIG. 3 is presented to the user and she or he begins to enter a text description of their request into the text box. This text forms the basis of a query which is used by the request type mapping module to identify and generate a list of one or more appropriate request types for allocation to the issue.

Thus, after receiving a query entered by a user at an ITS client (e.g. "mouse" in FIG. 4), query keywords are extracted from the text entered. This step may be performed either on the ITS client, or the entire query string may be transmitted to the request type mapping module to extract the query keywords.

As will be appreciated, the user may type whatever they wish into the text query field of the ITS interface. Accordingly, the ITS will need a mechanism to select query keywords from the entered text. In one form, either the ITS client or ITS server may have a process for natural language processing to select appropriate keywords for the query. In one form, this may simply involve removing certain stop words from the text entered and using the remaining text as the query.

Next, the request type mapping module performs a keyword matching at step 703 using the extracted keywords. More specifically, the keyword matching step 703 performs a keyword search using the subset historic requests 605, which include a selected number of historic issue items. Step 703 generates a shortlist of historic issue items from the subset historic requests 605 which include one or more of the extracted keywords in a predetermined one (or more) request data fields, e.g. in the summary data field. Next, the request type mapping module analyses the request type data fields of the shortlisted historic issue items and generates a list of the most popular request types. By most popular request types it is meant the request types that have the highest number of occurrences within the shortlist. Depending on the ITS implementation, the request type mapping module may generate a list of possible request types for allocation to the issue, including, for example, the 5 most popular request types of those historic issue items that contained the extracted keywords. These request types are then transmitted to the ITS client for display using a graphical user interface display, for example. In a simplest form, the generated request types are displayed as a list of items (which may be selectable links) in a rendered webpage such as that shown in FIG. 4. In the case the list of items rendered includes a link for each item, selection of the link can cause the ITS server to generate an ITS interface, such as that illustrated in FIG. 5, which is configured to enable creation of an issue in an ITS or request type corresponding to the selected link. In another form, the graphical user interface may include a widget such as a pull-down menu that includes and displays the request types and the process may be programmed to originally display such a widget or to update an existing widget to constraint the items in the widget to include only those request types that were identified. Input from a client computer or user terminal may specify one of the request types for allocation to the issue that is being created or edited.

The process illustrating FIG. 7, can be processed in real-time as the user is entering the request text into the text box of FIG. 3. This rapid querying of the database is facilitated by performing the keyword matching process across the subset historic requests 605 rather than the whole historic request table 602.

In another embodiment, the request type mapping module also performs a keyword matching of the extracted keywords with the request type names stored in the request type table 601 to locate and generate a list of one or more request type names that include the extracted keywords. In a preferred embodiment, this is done before the request type mapping module performs the search using the subset historic requests 605. Alternatively, this may be performed after, or in parallel with the keyword match using the subset historic request 605.

In yet another embodiment, the request type mapping module also performs a keyword matching of the extracted keywords with the service desk names stored in the service desk table 603, to locate and generate a list of one or more service desk names that include the extracted query words. In a preferred embodiment, this is done before the request type mapping module performs the search using the subset historic requests 605. Alternatively, this may be performed after, or in parallel with the keyword match using the subset historic requests 605. The request type module may extract the associated request types of the matching service desks and display those to the user, and/or simply display the matching service desk names to the user.

Figure 8:
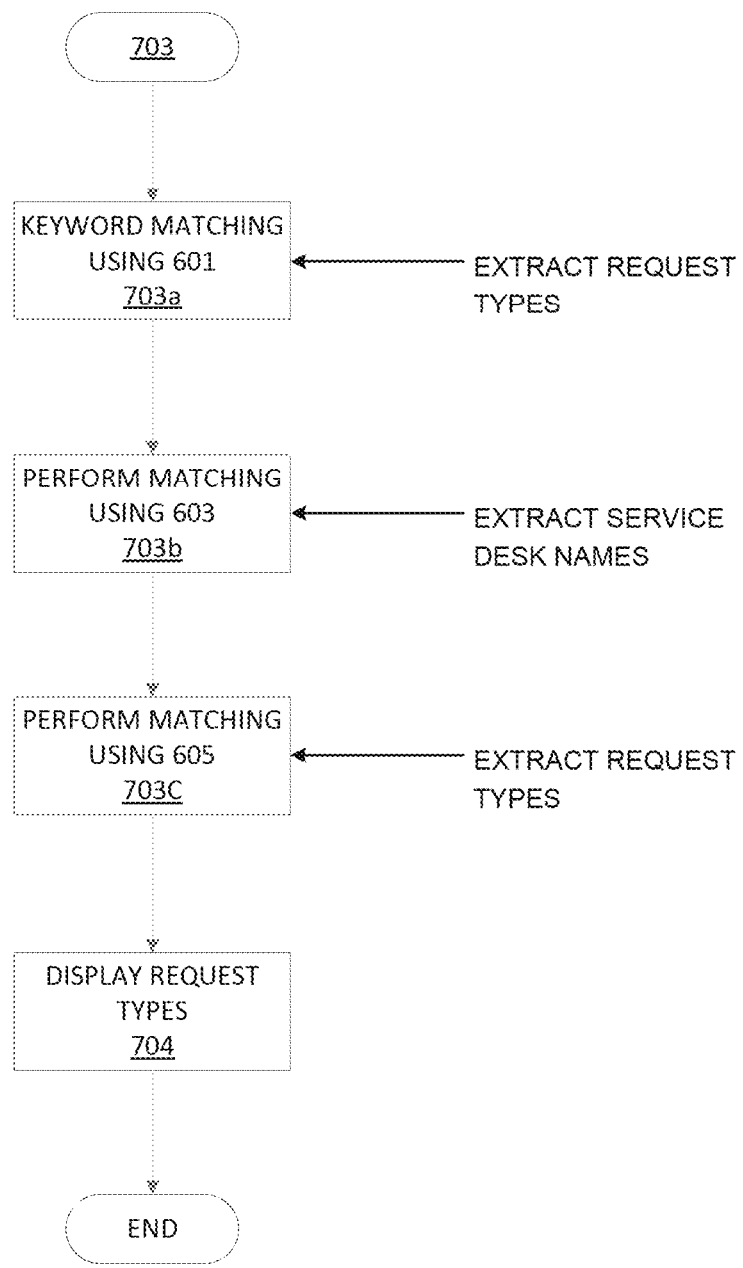
FIG. 8 shows a flow chart of the keyword matching steps carried out by the request type mapping module according to one embodiment.

In one embodiment, the request type mapping module performs a keyword matching of the extracted keywords using the request type table 601, to locate and generate a list of one or more request type names that include the extracted keywords of a query; next, the request type mapping module performs a keyword matching of the extracted keywords using the service desk table 603, to locate and generate a list of one or more service desk names that include the extracted keywords; finally, the request type mapping module performs a keyword matching of the extracted keywords using the subset historic requests 605, to locate those historic requests that include the extracted keywords in their request summary data field when they were generated, and locates and generates a list of the most popular request types using those shortlisted historic issue items. The request type mapping module may combine the generated lists of request types and service desk names and display these to the user on the ITS client. FIG. 8 depicts a flowchart of this embodiment. It will be appreciated that the keyword matching steps 703*a*, 703*b*, and/or 703*c* may be performed in different order than that illustrated in FIG. 8.

At step 704, the request type mapping module combines the request types and the service desk names located through keyword matching steps 703*a*-703*c* to generating a list of possible request types for allocation to the issue and displays all the generated list of request types and service desk names to the user on the ITS client. In one embodiment, step 704 involves updating a graphical user interface display, or other output such as a web page, to constrain the display or page to include only the generated list of possible request types and service desk names for allocation. Or, in an embodiment, step 704 involves originally generating a graphical user interface display, or other output such as a web page, that is constrained to include only the generated list of request types and service desk names.

In one form, when a large number of matching service desk names and request type names are located after the keyword matching step 703, the request type mapping module may automatically reduce the number of recommended request types to a manageable number (e.g. 5 request types) for displaying to the user on the ITS client.

The generation of the final list of recommendations for request type/service desk name allocation, by combining service desk or request types identified in steps 703A through 703C can be performed in a range of different ways. For example in one form, a list containing up to a predetermined maximum number of requests/service desk names will be generated. This list can be populated in a hierarchical manner, beginning with direct matches to service desk names. Thus if there are sufficient numbers of service desk name types which match the query then the entire list of returned results could be comprised of service desk name types. Alternatively, if the number of matches is less than the maximum length of the list (or zero) additional results in the list will be populated preferentially from the next level of the hierarchy. In this embodiment request type names provide the next layer in the hierarchy. Thus matching request name types can be added to the list. Again, if the combination of service desk names and request name types do not fill the list to the maximum number, one or more request name types located through the keyword matching step 703C can be provided.

Rules may be defined which change the relative balance between results from the three sources, for example, the n places in a list of length m may be allowed to be populated from direct matches on the service desk names and request name types, where at least m-n places will be populated from the matching step 703*c*.

As will be appreciated however, it will often be the case that direct matches between service desk names and request types will not occur so the matching process form using the subset of historic requests 605 may dominate results.

Working Example

Figure 4:
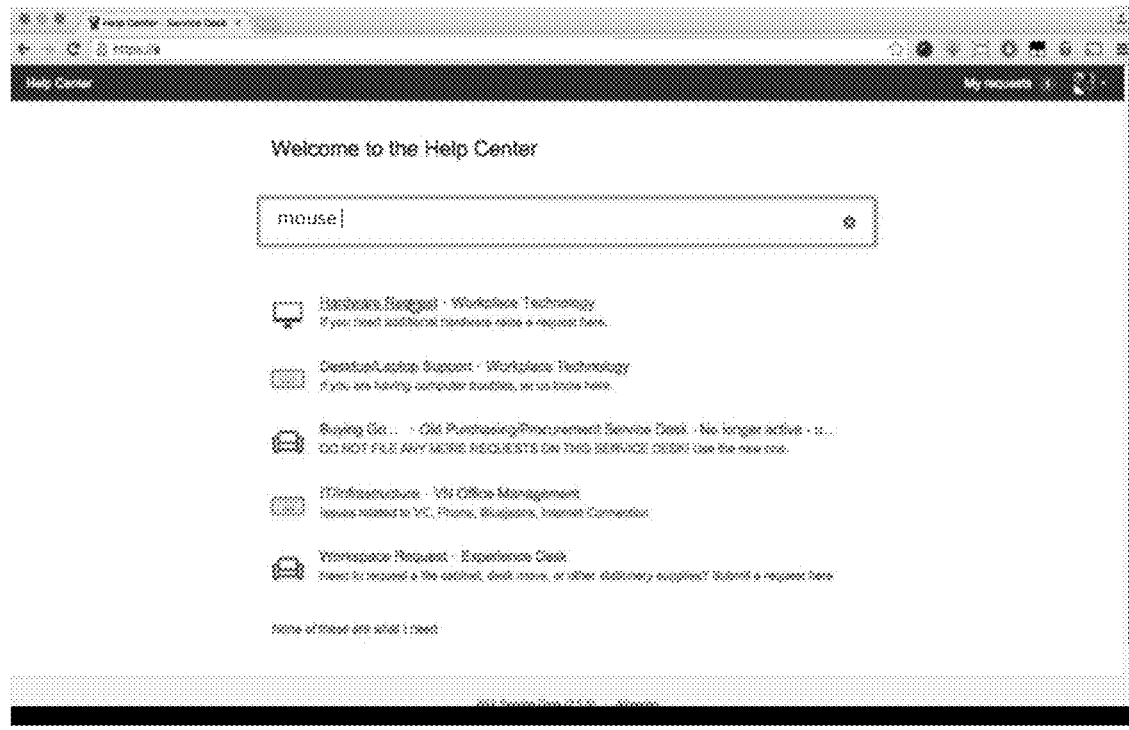
FIG. 4 illustrates an example ITS client interface.

FIG. 4 shows an exemplary user interface provided by an ITS client 114. The user interface provides an empty text entry box as previously seen in FIG. 3 into which a user may enter a query including one or more query terms, for example, 'mouse'. In response, the request type mapping module locates and generates a list of one or more request types based on the query that the user has just entered and displays the located one or more request types to the user. The request type mapping module may be programmed to generate a list of the request types with algorithmic steps including: querying a database of historic issue data, said historic issue data representing historic issues maintained by the issue tracking system, each historic issue being defined by at least a request type and request data, wherein the querying comprises searching said database of historic issue data using one or more of said keywords; locating one or more historic issues that include said one or more keywords in its request data; extracting the request type of each of the located historic issues; selecting one or more request types based on a popularity of each request type amongst the located historic issues; generating a list of possible request types for allocation to the issue description, including at least one or more of said selected request types. The associated service desk information for those request types is also displayed. In the example shown, the query 'mouse' has 5 related request types including: 'Hardware request', 'Desktop/Laptop support', 'Buying Go . . . ', 'IT/Infrastructure', and 'Workspace Request'. Their associated service desk information, such as 'Workplace Technology', 'Old Purchasing/Procurement Service Desk', 'VN Office Management' and 'Experience Desk' are also displayed next to each of the request type to assist the user in choosing the right service desk. A benefit of this approach is that the request types shown in FIG. 4 are constrained to only those that are relevant to the search query, and have been determined to have been historically popular for the search query. It will be appreciated that the request mapping module can be configured to display a predetermined number of associated request types based on system settings.

The relevant request types, and/or service desk information may be presented to a user as text description such as that shown in FIG. 4, or in another form, e.g. icons, that is easy to understand for a user.

Figure 5:
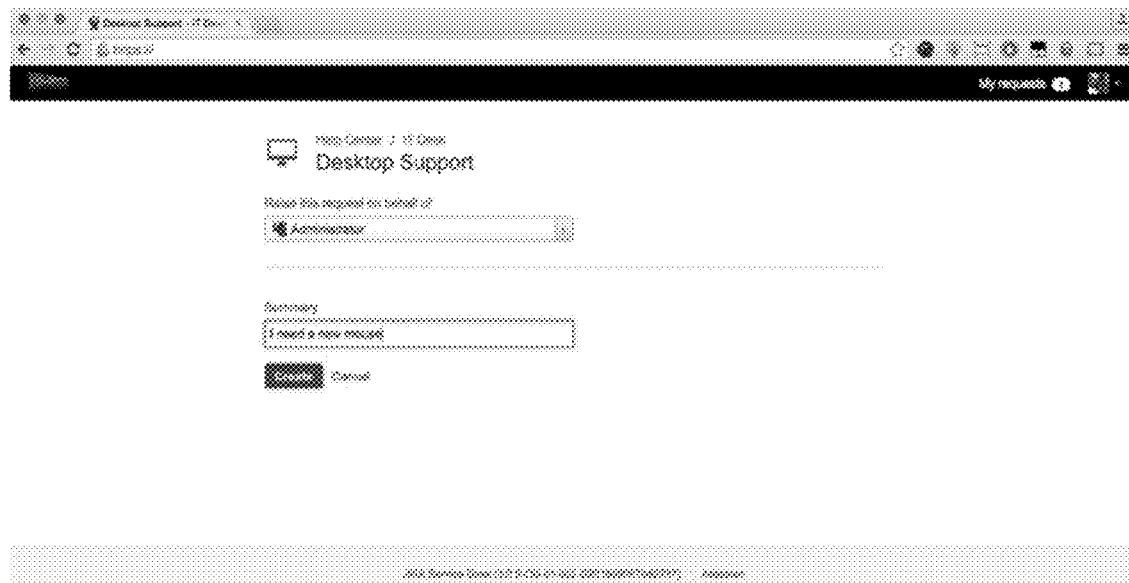
FIG. 5 illustrates an exemplary ITS client interface.

After selecting a request type and/or a service desk associated with the query 'mouse', the user may then be directed to a second user interface to provide more information of the actual request to be submitted to the server such as that shown in FIG. 5. The user is prompted to enter a brief summary by describing the exact problem or the action required, for example 'Is there an Apple Trackpad available for me to try out', or 'Problem with mouse or trackpad—' click' stops working'. Some parameters may be automatically generated by the ITS 100. For example, the ITS 100 itself will typically generate a key that can be used to uniquely identify the user request, which may be hidden from or visible to the user. Once an issue has been created a user can interact with it, for example by adding additional information to the issue, changing the state of the issue etc.

Embodiments of the present disclosure have been found to be particularly adaptable and useful in environments where multiple service desks and multiple request types are used. In such systems the difficulty in finding the appropriate request type for the user is heightened and may be simplified using an embodiment of the system described herein. In some instances, the ITS request type mapping module could be configured to search across all of the available service desks for matching request types to provide results to the user. However, in some instances the search process can be confined to a particular service desk which corresponds to the identity of the user or client device 112A. Moreover, by confining the request type search process to a subset of all historical request types, some embodiments can advantageously adapt their search results to provide most relevant results to a user. For example, over a period of time, if a series of similar issues arise, for example due to some systemic or network-wide problem, multiple users may seek to enter similar issues into the ITS. After the first entry of such an issue, each subsequent time a similar issue is entered by a user, the chance of correctly allocating the request type to the issue goes up as the past requests will be in the subset historic requests which is being searched. As a particular issue drops from prominence, its presence in the subset historic requests will decrease.

This adaptive characteristic of certain embodiments also lends itself to use in environments where use of jargon is common, or even multilingual environments. In these scenarios users may describe issues to be raised in the ITS using either specialist language, slang, or foreign language terms. In embodiments of the present disclosure, because a mapping arises within the historical request data between a request type and the specialist language (e.g. foreign language term) the correct recommendation of a request type to issues described in this way can still occur, regardless of whether any formal recognition of the term or language by the ITS exists. The search mechanism merely treats the entered request term as a keyword into a search but does not attempt to parse this language. Accordingly, using these approaches, a computer implemented method is provided for use in an issue creation process in an issue tracking system, the method comprising receiving an issue description comprising one or more keywords; querying a database of historic issue data, said historic issue data representing historic issues maintained by the issue tracking system, each historic issue being defined by at least a request type and request data, wherein the querying comprises searching said database of historic issue data using one or more of said keywords; locating one or more historic issues that include said one or more keywords in its request data; extracting the request type of each of the located historic issues; selecting one or more request types based on a popularity of each request type amongst the located historic issues; generating a list of possible request types for allocation to the issue description, including at least one or more of said selected request types; allocating a particular request type to an issue corresponding to the issue description in response to receiving input that selects the particular request type from among the list of possible request types.

In one feature, the method further comprises querying a request type table maintained by the issue tracking system, wherein said request type table stores predefined request type names; and generating a list of one or more matching request type names that include the one or more query keywords, wherein the list including one or more of said selected request types further includes one or more of said matching request types.

In another feature, the historic issue data comprises issues that are ordered based on a time value, said time value being the time each issue is entered in the issue tracking system. In another feature, the subset of historic issue data comprises the most recent issues entered in the issue tracking system. In yet another feature, the method further comprises one or more of: generating a graphical user interface display that includes the list of the possible request types for allocation to the issue description and no other request types; or updating a graphical user interface display to include the list of the possible request types for allocation to the issue description and no other request types.

In one feature, the method further comprises querying a service desk table maintained by the issue tracking system, said service desk table stores system predefined service desk names; and generating a list of one or more service desk names that include the one or more query keywords. In another feature, the method further comprises displaying the most popular request types that are generated after querying a subset of historic issue data, the subset of historic issue data comprises the most recent issues entered in the issue tracking system, and the one or more service desk names that are generated through querying the service desk table.

In a further feature, the method further comprises displaying one of the most popular request types located through querying subset historic issue data, and four of the request type names generated through querying the request type table. In yet another feature, the method further comprises facilitating receiving a selection of a request type from the displayed request types for use in the issue editing process.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
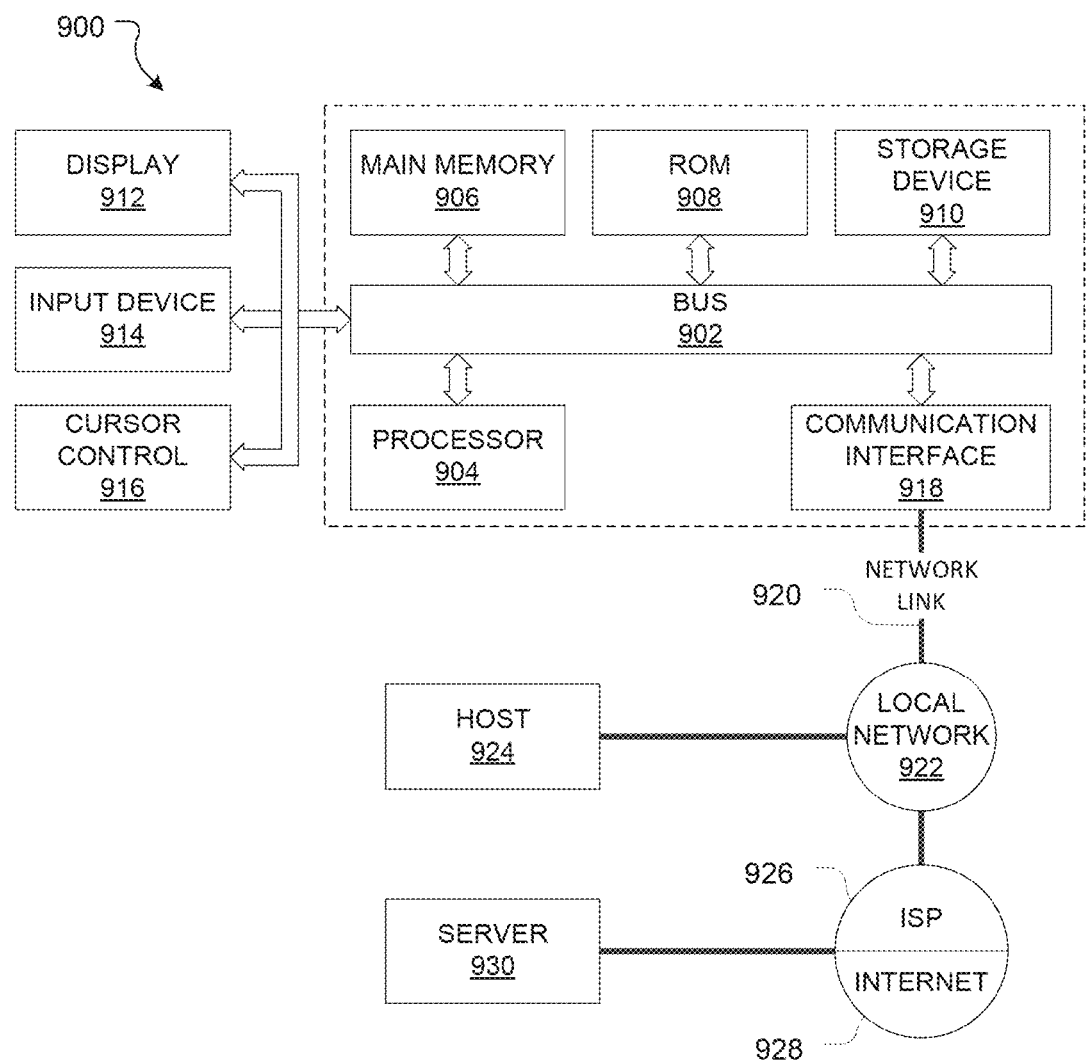
FIG. 9 illustrates a computer system which may be used to implement various embodiments.

For example, FIG. 9 is a block diagram that illustrates a computer system 900 upon which an embodiment of the invention may be implemented. Server computer 102 and/or user computer 112 may be computer systems such as 900.

Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to one or more output devices such as a display 912 for displaying information to a computer user. Display 912 may, for example, be a cathode ray tube (CRT), a liquid crystal display (LCD), a light emitting diode (LED display), or a touch screen display. An input device 914, including alphanumeric and other keys, may be coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Additional and/or alternative input devices are possible, for example touch screen displays.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

A computer system as described herein may be configured in a plurality of useful arrangements. In one approach, a data processing method comprises using a server computer, obtaining from one or more non-transitory computer-readable data storage media a copy of one or more sequences of instructions that are stored on the media and which when executed using a particular user computer among a plurality of user computers cause the particular user computer to perform, using the particular user computer alone or in combination with the server computer, the techniques that are described herein; and using the server computer, downloading the copy of the one or more sequences of instructions to any user computer among the plurality of user computers.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

A computer system may take a variety of forms. For example, a client computer may be a desktop computer, a laptop computer, a notebook computer, a tablet computer, a smart phone, or other computer.

In the embodiments described above the request type mapping module (and the various features and functions it performs) is described as a plugin for use with a host.

Alternative implementations are possible. For example, the request type mapping module may be implemented to be integral/native to a broader computer program or application. The request type mapping module could alternatively be implemented as a stand-alone application that communicates with other applications in order to perform the relevant functions.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

A number of flowcharts are provided in order to illustrate processing or functional steps. Although these flowcharts define steps in particular orders to explain various features in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented method for creating a new issue in an issue tracking system, the computer implemented method comprising:
   instantiating a user interface of the issue tracking system;
   causing a display of a text-entry box in the user interface of the issue tracking system;
   receiving, at the text-entry box, an unstructured user input comprising a natural language string;
   extracting one or more keywords from the natural language string;
   prior to creating the new issue in the issue tracking system, determining a set of multiple suggested request types by querying a database of historic issue data using the one or more keywords to identify a set of historic issues from the historic issue data, each historic issue of the set of historic issues being tracked by the issue tracking system and having a respective request type of a set of predefined request types;
   causing display of a list of multiple selectable links in a region below the text-entry box, each selectable link of the list of multiple selectable links being selectable to cause display of a respective issue creation interface that is configured to prompt the user for issue creation text, each selectable link associated with a service desk designated for a respective request type of the set of multiple suggested request types and each selectable link including a service desk descriptor identifying the service desk;
   in response to a user selection of a particular selectable link of the list of multiple selectable links, causing display of a particular issue creation interface that is associated with a particular service desk and a particular request type; and
   in response to user input provided to the particular issue creation interface, causing a new issue to be created in the issue tracking system and cause the new issue to be routed to the particular service desk.

2. The computer implemented method of claim 1, wherein the historic issue data comprises issues that are ordered based on a time value, the time value being a time each issue is entered in the issue tracking system.

3. The computer implemented method of claim 1, further comprising:
   querying a request type data maintained by the issue tracking system, the request type data storing predefined request type names; and
   generating a list of one or more matching request type names that include the one or more keywords, wherein the set of multiple suggested request types includes the list of one or more matching request type names.

4. The computer implemented method of claim 1, further comprising:
   querying a service desk data maintained by the issue tracking system, the service desk data storing predefined service desk names; and
   generating a list of one or more matching service desk names that include the one or more keywords.

5. The computer implemented method of claim 4, further comprising extracting additional request types associated with the list of one or more matching service desk names, wherein the set of multiple suggested request types further includes the additional request types.

6. The computer implemented method of claim 1, further comprising displaying a list of most popular request types and service desk names that is generated after querying the historic issue data, a request type data, and a service desk data.

7. An issue tracking system used for creating and tracking of issues, the issue tracking system comprising:
   one or more processors; and
   one or more non-transitory computer-readable storage media storing sequences of instructions which, when executed by the one or more processors, cause the one or more processors to:
   instantiate a user interface of the issue tracking system;
   cause display of a text-entry box in the user interface of the issue tracking system;
   receive, at the text-entry box, an unstructured user input comprising a natural language string;
   extract one or more keywords from the natural language string;
   prior to creating a new issue in the issue tracking system, determine a set of multiple suggested request types by querying a database of historic issue data using the one or more keywords to identify a set of historic issues from the historic issue data, each historic issue of the set of historic issues being tracked by the issue tracking system and having a respective request type of a set of predefined request types;

cause display of a list of multiple selectable links in a region below the text-entry box, each selectable link of the list of multiple selectable links being selectable to cause display of a respective issue creation interface that is configured to prompt the user for issue creation text, each selectable link associated with a service desk designated for a respective request type of the set of multiple suggested request types and each selectable link including a service desk descriptor identifying the service desk;

in response to a user selection of a particular selectable link of the list of multiple selectable links, cause display of a particular issue creation interface that is associated with a particular service desk and a particular request type; and in response to user input provided to the particular issue creation interface, cause a new issue to be created in the issue tracking system and cause the new issue to be routed to the particular service desk.

8. The issue tracking system of claim 7, wherein the historic issue data comprises issues that are ordered based on a time value, the time value being a time each issue is entered in the issue tracking system.

9. The issue tracking system of claim 7, wherein the sequences of instructions which, when executed by the one or more processors, further cause the one or more processors to:
query a request type data maintained by the issue tracking system, the request type data storing predefined request type names; and
generate a list of one or more matching request type names that include the one or more keywords, wherein the set of multiple suggested request types includes the list of one or more matching request type names.

10. The issue tracking system of claim 7, wherein the sequences of instructions which, when executed by the one or more processors, further cause the one or more processors to:
query a service desk data maintained by the issue tracking system, the service desk data storing predefined service desk names;
generate a list of one or more matching service desk names that include the one or more keywords; and
extract additional request types associated with the list of one or more matching service desk names, wherein the set of multiple suggested request types further includes the additional request types.

11. The issue tracking system of claim 7, wherein the sequences of instructions which, when executed by the one or more processors, further cause the one or more processors to display a list of most popular request types and service desk names that is generated after querying the historic issue data, a request type data, and a service desk data.

12. One or more non-transitory machine-readable storage media storing one or more sequences of program instructions which, when executed by one or more computing devices, cause performance of:
instantiating a user interface of an issue tracking system;
causing a display of a text-entry box in the user interface of the issue tracking system;
receiving, at the text-entry box, an unstructured user input comprising a natural language string;
extracting one or more keywords from the natural language string;
prior to creating a new issue in the issue tracking system, determining a set of multiple suggested request types by querying a database of historic issue data using the one or more keywords to identify a set of historic issues from the historic issue data, each historic issue of the set of historic issues being tracked by the issue tracking system and having a respective request type of a set of predefined request types;
causing display of a list of multiple selectable links in a region below the text-entry box, each selectable link of the list of multiple selectable links being selectable to cause display of a respective issue creation interface that is configured to prompt the user for issue creation text, each selectable link associated with a service desk designated for a respective request type of the set of multiple suggested request types and each selectable link including a service desk descriptor identifying the service desk;
in response to a user selection of a particular selectable link of the list of multiple selectable links, causing display of a particular issue creation interface that is associated with a particular service desk and a particular request type; and
in response to user input provided to the particular issue creation interface, causing a new issue to be created in the issue tracking system and cause the new issue to be routed to the particular service desk.

13. The one or more non-transitory machine-readable storage media of claim 12, wherein the historic issue data comprises issues that are ordered based on a time value, the time value being a time each issue is entered in the issue tracking system.

14. The one or more non-transitory machine-readable storage media of claim 12, wherein the one or more sequences of program instructions which, when executed by the one or more computing devices, further cause performance of:
querying a request type data maintained by the issue tracking system, the request type data storing predefined request type names; and
generating a list of one or more matching request type names that include the one or more keywords, wherein the set of multiple suggested request types includes the list of one or more matching request type names.

15. The one or more non-transitory machine-readable storage media of claim 12, wherein the one or more sequences of program instructions which, when executed by the one or more computing devices, further cause performance of:
querying a service desk data maintained by the issue tracking system, the service desk data storing predefined service desk names; and
generating a list of one or more matching service desk names that include the one or more keywords.

16. The one or more non-transitory machine-readable storage media of claim 15, wherein the one or more sequences of program instructions which, when executed by the one or more computing devices, further cause performance of extracting additional request types associated with the list of one or more matching service desk names, wherein the set of multiple suggested request types further includes the additional request types.

17. The one or more non-transitory machine-readable storage media of claim 12, wherein the one or more sequences of program instructions which, when executed by the one or more computing devices, further cause performance of displaying a list of most popular request types and service desk names that is generated after querying the historic issue data, a request type data, and a service desk data.

\* \* \* \* \*